Figure 1:
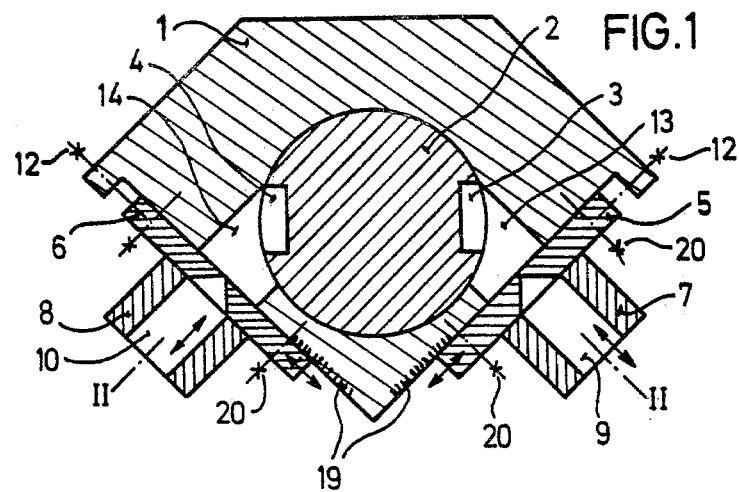

United States Patent [19]

Kelterbaum

[11] 4,344,919
[45] Aug. 17, 1982

[54] PROCESS AND APPARATUS FOR THE COUNTER-CURRENT INJECTION-MIXING OF TWO OR MORE FLUID PLASTIC COMPONENTS WHICH REACT WITH ONE ANOTHER

[75] Inventor: Manfred Kelterbaum, Strasslach, Fed. Rep. of Germany

[73] Assignee: Elastogran Maschinenbau GmbH & Co., Strasslach, Fed. Rep. of Germany

[21] Appl. No.: 158,069

[22] Filed: Jun. 10, 1980

[30] Foreign Application Priority Data

Jun. 22, 1979 [DE] Fed. Rep. of Germany ....... 2925173
Jun. 22, 1979 [DE] Fed. Rep. of Germany ... 7917920[U]

[51] Int. Cl.$^3$ ............................................. B01J 14/00
[52] U.S. Cl. .................................... 422/133; 366/177; 366/182; 422/135; 425/261
[58] Field of Search ................................ 422/133, 135; 425/256–261; 366/177, 182; 137/897; 251/155

[56] References Cited

U.S. PATENT DOCUMENTS

| 3,761,060 | 9/1973 | Schab et al. | 366/165 |
| 3,908,966 | 9/1975 | Boden et al. | 366/179 |
| 3,936,036 | 2/1976 | Fries | 366/173 |

FOREIGN PATENT DOCUMENTS

| 1779037 | 4/1971 | Fed. Rep. of Germany. |
| 7047142 | 1/1972 | Fed. Rep. of Germany. |
| 2145547 | 12/1973 | Fed. Rep. of Germany. |
| 2346347 | 3/1975 | Fed. Rep. of Germany. |
| 2348608 | 4/1975 | Fed. Rep. of Germany. |
| 2314459 | 3/1975 | Fed. Rep. of Germany. |
| 2007935 | 10/1975 | Fed. Rep. of Germany. |
| 2416686 | 10/1975 | Fed. Rep. of Germany. |
| 2117533 | 4/1976 | Fed. Rep. of Germany. |

*Primary Examiner*—Michael S. Marcus
*Attorney, Agent, or Firm*—Keil & Witherspoon

[57] ABSTRACT

To mix two or more fluid plastic components, which react with one another, intimately and abruptly, the components are injected under high pressure and at high velocity into a mixing chamber. To provide greater control of the type of mixing, i.e. to allow control of the spread of the jet and/or the jet volume and the jet energy losses, the components are guided so that they impinge on one another at an angle, preferably an angle which can be varied. To achieve this, and in particular to allow the point of impingement of the jets to be varied, the injection nozzles can be slid or pivoted at right angles to the lengthwise axis of the mixing chamber, and may also be adjustable in the direction of the said axis, and in respect of their distance from the axis.

6 Claims, 3 Drawing Figures

PROCESS AND APPARATUS FOR THE COUNTER-CURRENT INJECTION-MIXING OF TWO OR MORE FLUID PLASTIC COMPONENTS WHICH REACT WITH ONE ANOTHER

The present invention relates to a process and apparatus for the counter-current injection of two or more fluid plastic components which react with one another, especially for the preparation of a polyurethane, in a mixing chamber.

A great diversity of processes and apparatus of the above type has been disclosed. In this prior art, the injection nozzles are arranged exactly opposite one another, so as to ensure intimate and abrupt mixing of the components, impinging on one another under high pressure and at high velocity. Once a prior art mixing apparatus has been assembled, however, it is no longer possible substantially to vary the jet pattern or path. The prior art assumes that for optimum mixing it is important that the angle between the jets of the injected components should be 180° (German Pat. No. 2,117,533).

It is an object of the present invention further to improve mixing in a process and apparatus of the above type and in particular to provide greater scope for controlling the type of mixing in the mixing chamber.

I have found that this object is achieved if the jets of the plastic components entering the mixing chamber impinge on one another at an angle, the point of impingement in the mixing chamber being variable. In this way it is possible to control the jet energy losses and the jet spread and/or jet volume, to achieve optimum mixing of the components. A further improvement is achieved in that the angle at which the jets impinge on one another can be varied.

The apparatus according to the invention is constructed so that the injection nozzles are arranged in respect of the mixing chamber in such a way that their jets impinge on one another at an angle, and that the nozzles are adjustable in the mixing chamber so as to allow the point of impingement of the jets to be varied.

Using the process according to the invention and the corresponding apparatus, plastics having a great diversity of properties can be mixed to produce a great diversity of end products. The invention allows the process and apparatus to be varied to suit the particular plastic components employed, and hence also allows the properties and quality of the end product to be controlled. The mixing achievable is so efficient that the additional mixing devices (sprues) frequently needed can, in the novel process, be smaller or be omitted entirely. It is also possible to stagger the flow of one component relative to the other by a desired amount. As a result of the components impinging on one another at an angle, preferably at an angle of from 70° to 110°, in the mixing chamber, and of staggering the timing of one jet relative to the other, it is possible to produce a vortex in the mixing chamber, especially if the latter is of circular cross-section, and this vortex has an effect on the mixing action. Accordingly, the components not only mix as a result of the impingement on one another, but also as a result of a kind of stirring effect produced by the flow of the components.

Figure 2:
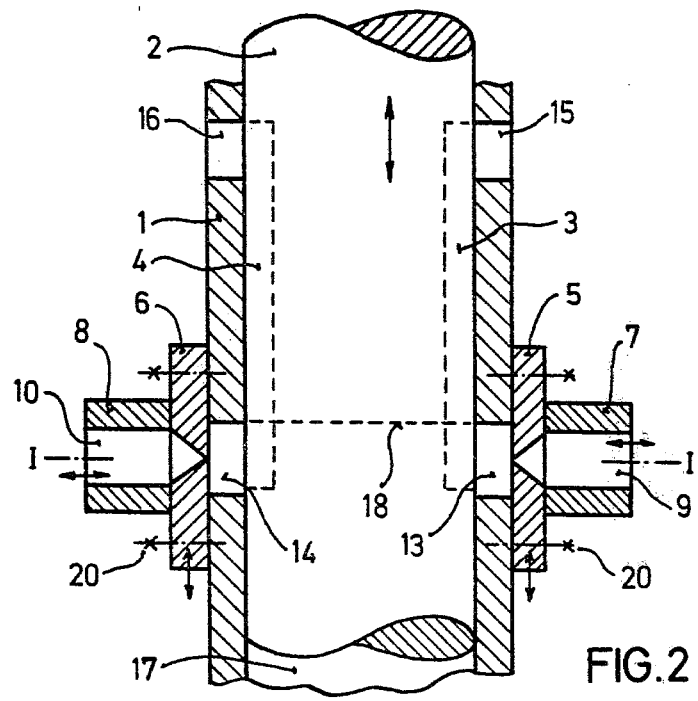
Figure 3:
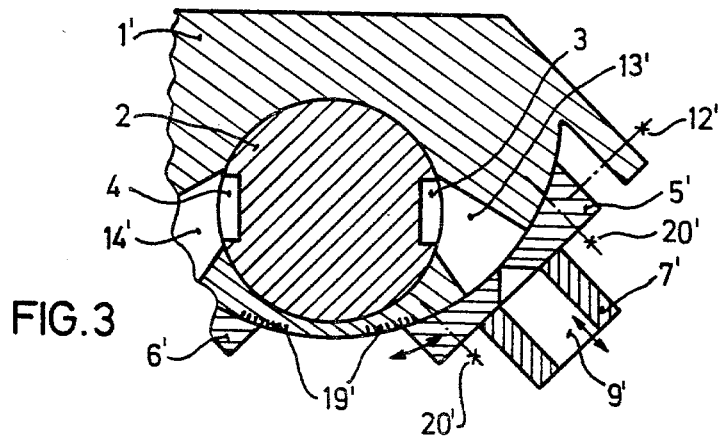

The invention is further illustrated below with reference to the accompanying drawing in which FIG. 1 shows a cross-section through one embodiment of an apparatus according to the invention, along line I—I of FIG. 2, FIG. 2 shows a longitudinal section along line II—II of FIG. 1, and FIG. 3 shows a cross-section, corresponding to FIG. 1, through a different embodiment.

The mixing apparatus shown in FIGS. 1 and 2 consists of a housing 1 in which a control piston 2 can be moved to and fro. The cross-section of the control piston 2 matches that of the mixing chamber 17. Two return flow grooves 3 and 4 are provided in the control piston 2. Inlet orifices 13 and 14 lead to the mixing chamber. The outlet orifice is not shown in FIG. 2 and is located lower down, and below the inlet orifices 13 and 14.

The injection nozzles 9 and 10 for the plastic components which are to be mixed are located in nozzle holders 7 and 8 which in turn are fastened to plates 5 and 6.

In the embodiment shown in FIGS. 1 and 2, the plates 5 and 6 can be moved rectilinearly in a plane at right angles to the lengthwise axis of the mixing chamber. This is indicated in FIG. 1 by the double-headed arrows aligned with plate 5. The plates 5 and 6 are fastened by means of screws 20 in slots, not particularly shown, and this provides the adjustability. The actual adjustment is made by adjusting screws 12 which are carried in projections of the housing 1. When the desired position is reached, the screws 20 are secured, so that this position can no longer be changed. The screws are merely indicated by dashed lines.

The distance of the nozzles 9 and 10 from the lengthwise axis of the mixing chamber is also adjustable, as is again indicated by double-headed arrows.

If desired, it is also possible to provide for adjustment of the plates 5 and 6 in the direction of the lengthwise axis of the mixing chamber 17, as indicated by double-headed arrows in FIG. 2.

The design of the means of adjustment will be obvious to an expert engineer and can be selected by him to suit the particular design possibilities.

Scales 19 permit the reproduction of a setting previously found to be advantageous, and also show any adjustment which has been made.

In the embodiment in FIG. 3, in which reference numerals corresponding to those employed in FIGS. 1,2 have been used except for having been placed in primed form to designate generally similar parts, plates 5' and 6' are not slidable rectilinearly as in FIGS. 1/2 but they are "pivotable", that is they are slidable along a circular path. The housing, surfaces and the corresponding surfaces of the plates 5' and 6', are therefore of circular configuration. In this embodiment, scales, in this embodiment designated 19', are again provided. The screws, here 12' and 20', for making the adjustment and for locking are again indicated in dashed lines. Double-headed arrows show the type of adjustment.

The injection nozzles can be adjusted, rectilinearly slid and/or pivoted in a great diversity of ways, so that the jets can also impinge asymmetrically on one another in the mixing chamber.

In FIG. 2, the control piston 2 is shown in the closed or return position. If, in this position, plastic components are fed, from stock vessels which are not shown, through the nozzles 9 and 10, the component streams flow through the inlet orifices 13 and 14 into the return grooves 3 and 4 and, through outlet orifices 15 and 16, back into their respective storage tanks. If mixing is to be effected, the control piston 2 is moved out of the zone of the inlet orifices 18, so that the jets of the plastic components enter the mixing chamber, impinge on one another in accordance with the setting of the injection nozzles, and mix with one another. The mixture then issues from the outlet orifice, which is not shown in the drawing, for example into a mold. As a result of the fact that the jets do not impinge on one another at an angle of 180°, a vigorous vortical motion results in the chamber and this influences the mixing action. For example, one injection nozzle can be arranged differently from the other, so that the jets do not meet on a line of symmetry of the mixing chamber. As a result, the flow of one component is staggered relative to the other. This influences the mixing and hence the end product obtained. The most advantageous and economical setting of the injection nozzles can for example be ascertained by simple preliminary experiments with the plastic components concerned. This setting can then be recorded. It is left unchanged until different plastic components are to be used and different end products are to be produced. If, at a later point in time, plastic components with known properties are to be employed in known formulations, it is possible, by means of the scales, to set the mixing chamber, from the start, to the setting found to be correct on a previous occasion.

In particular it is possible to allow the jets to impinge on one another outside a line of symmetry, contrary to the symmetrical jet pattern shown in FIGS. 1 and 3. One jet then travels a longer path than the other before impinging on the second jet. This assists the creation of a vortical motion in the mixing chamber.

The mixing chamber can also have a non-circular cross-section.

I claim:

1. Apparatus for the counter-current injection mixing of two or more fluid plastic components which react with one another, comprising a mixing chamber which possesses inlet orifices for the individual components and an outlet for the component mixture, injection nozzles so arranged in the orifices relative to the mixing chamber that the jets impinge on one another at an angle in the mixing chamber, the injection nozzles being adjustable so as to allow the point of impingement of the component jets in the mixing chamber to be varied, wherein said mixing apparatus comprises
    a housing having an exterior wall, and
    nozzle holding or mounting means located on, and detachably connected to, said exterior wall, said holding or mounting means having a surface cooperating with and slidable along the exterior wall surface in contacting engagement with the last-mentioned surface so as to render the impingement angle adjustable.

2. A mixing apparatus as claimed in claim 4, wherein said cooperating surfaces are planar so as to render said nozzle holding/mounting means slidable on a rectilinear path along said plane.

3. A mixing apparatus as claimed in claim 4, wherein said cooperating surfaces are of a circular configuration so as to render said nozzle holding/mounting means slidable on a circular path along said plane.

4. A mixing apparatus as claimed in claim 1, wherein the cooperating surfaces of said exterior wall and of said nozzle holding or mounting means are oriented so that said holding or mounting means are slidable along a plane perpendicular to the longitudinal axis of the mixing chamber.

5. A mixing apparatus as claimed in claim 1, wherein there are provided means for adjusting the distance of the injection nozzle from the axis of the mixing chamber.

6. A mixing apparatus as claimed in claim 1, wherein said housing and said nozzle holding/mounting means are of a design such as to render said nozzle holding/mounting means movable in a direction perpendicular as well as parallel to the longitudinal axis of the mixing chamber.

* * * * *

UNITED STATES PATENT AND TRADEMARK OFFICE
CERTIFICATE OF CORRECTION

PATENT NO. : 4,344,919

DATED : August 17, 1982

INVENTOR(S) : Manfred Kelterbaum

It is certified that error appears in the above-identified patent and that said Letters Patent are hereby corrected as shown below:

IN THE CLAIMS:

Claim 4 should be numbered -- Claim 2 --.

Claim 2 should be numbered -- Claim 3 --; and the appendency of this Claim should read -- Claim 2 -- instead of Claim 4.

Claim 3 should be numbered -- Claim 4 --; and the appendency of this claim should read -- Claim 2 -- instead of Claim 4.

The foregoing three claims should appear in this order.

Signed and Sealed this

Tenth Day of May 1983

[SEAL]

Attest:

GERALD J. MOSSINGHOFF

Attesting Officer

Commissioner of Patents and Trademarks